United States Patent [19]

Farries

[11] Patent Number: 5,778,119
[45] Date of Patent: Jul. 7, 1998

[54] IN-LINE GRATING DEVICE FOR FORWARD COUPLING LIGHT

[75] Inventor: Mark Farries, Nepean, Canada

[73] Assignee: JDS Fitel Inc., Nepean, Canada

[21] Appl. No.: 727,011

[22] Filed: Oct. 8, 1996

[51] Int. Cl.[6] ................................................ G02B 6/34
[52] U.S. Cl. ............................... 385/37; 385/24; 385/50
[58] Field of Search .............................. 385/10, 15, 24, 385/31, 37, 39, 43, 50

[56] References Cited

U.S. PATENT DOCUMENTS

| | | | |
|---|---|---|---|
| 5,430,817 | 7/1995 | Vengsarkar | 385/37 |
| 5,457,758 | 10/1995 | Snitzer | 385/30 |
| 5,457,760 | 10/1995 | Mizrahi | 385/37 |
| 5,550,940 | 8/1996 | Vengsarkar et al. | 385/37 X |
| 5,574,807 | 11/1996 | Snitzer | 385/24 |
| 5,633,965 | 5/1997 | Bricheno et al. | 385/37 |
| 5,638,473 | 6/1997 | Byron | 385/37 |

*Primary Examiner*—John D. Lee
*Attorney, Agent, or Firm*—Neil Teitelbaum & Associates

[57] ABSTRACT

A device for coupling out of or into a transmission system which carries light signals is provided. A first optical fiber having a Bragg grating therein has its cladding optically coupled to a second optical fiber having a Bragg grating therein so as to allow at least a predetermined wavelength of light incident upon the first Bragg grating to be forward coupled from the core to the cladding and then to the core region of the second optical waveguide via the second Bragg grating.

10 Claims, 6 Drawing Sheets

PRIOR ART

PRIOR ART

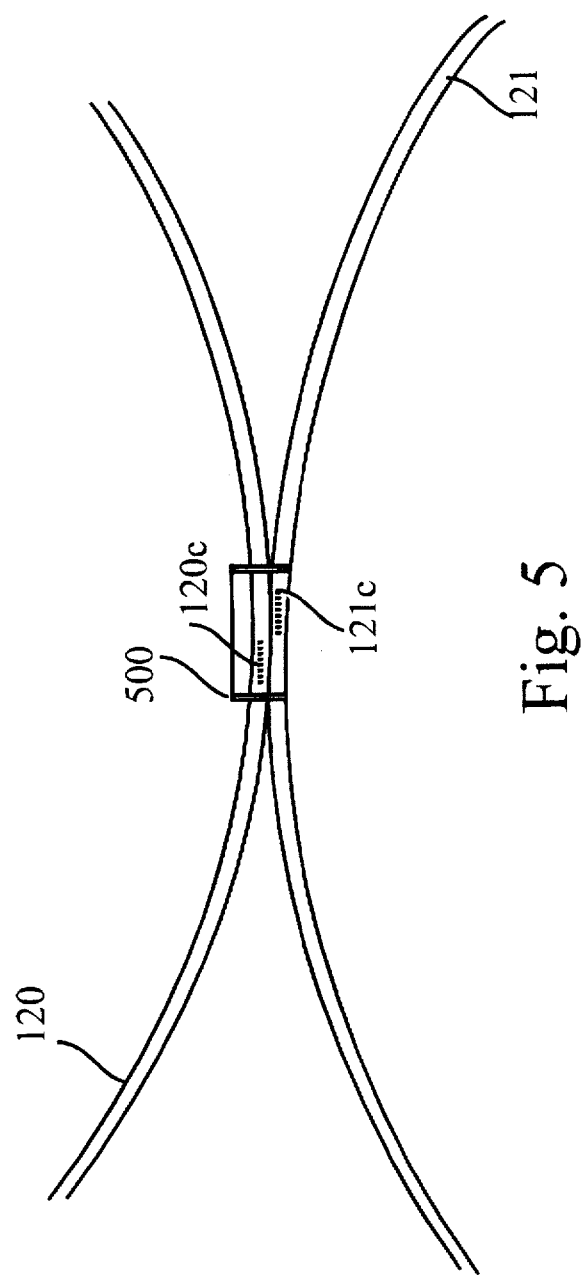

IN-LINE GRATING DEVICE FOR FORWARD COUPLING LIGHT

FIELD OF THE INVENTION

This invention relates to an optical coupler and more particularly to utilizing Bragg gratings within optical waveguides to achieve coupling therebetween.

BACKGROUND OF THE INVENTION

The development of Bragg grating reflectors within single mode optical fibres is well known and has been described in various United States patents. For example, one type of a Bragg filter, is incorporated or embedded in the core of an optical fiber by a method disclosed, in U.S. Pat. No. 4,807, 850. As is discussed in this patent, permanent periodic gratings of this kind can be provided or impressed in the core of an optical fibre by exposing the core through the cladding to the interference pattern of two coherent beams of ultraviolet light that are directed against the optical fibre symmetrically to a plane normal to the fiber axis. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute the Bragg grating. The embedded Bragg grating of this kind reflects the light launched into the fiber core for guided propagation therein, in a propagation direction; only that light having a wavelength within a very narrow range dependent on the grating element periodicity is reflected back along the fibre axis opposite to the original propagation direction, while being substantially transparent to light at wavelengths outside the aforementioned narrow band so that it does not adversely affect the further propagation of such other light. In effect, this type of grating creates a narrow notch in the transmission spectrum, and by the same token a similarly narrow peak in the reflection spectrum. However, one limitation in utilizing Bragg gratings is that they are two port devices. Although the use of Bragg gratings in optical transmission systems is highly desirable, it becomes readily apparent that there is a need for a three or more port device for use in adding and/or dropping a light signal at a predetermined centre wavelength, to or from such transmission system without disturbing other signals at other wavelengths. One method of achieving this is disclosed by David R. Huber who in U.S. Pat. No. 5,283,686 disclosed using a Bragg grating with an optical circulator.

J. L. Archambault et al. in a paper entitled Grating-frustrated coupler: a novel channel-dropping filter in a single mode optical fiber published in Opt. Lett. V 19, pp 180–182 1996 in which weak coupling is obtained between two fibers that have been polished close to the core and the coupling is enhanced by the resonance in the fiber Bragg grating. However, this technique suffers from low wavelength isolation (13dB) and instabilities in the coupling magnitude.

U.S. Pat. No. 5,457,758 describes the following various devices in the prior art which are candidates for use in fabricating an optical coupler or an add/drop circuit. A publication entitled "All-Fibre Narrowband Reflection Gratings at 1500 nm" by R. Kashyap, J. R. Armitage, R. Wyatt, S. T. Davey, and D. L. Williams, published in Electronic Lett., vol. 26, 1990, pp. 730–732, discloses a 50%×50%, 2 by 2 fiber coupler which is used to couple signal input at all wavelengths and to extract Bragg reflected light. The device and its method of use are disadvantageous in that there is said to be a loss of at least 75% of reflected light intensity.

A publication entitled "Formation of Bragg gratings in optical fibers by a transverse holographic method" by G. Meltz, W. W. Morey, and W. H. Glenn, published in Optics Lett., vol. 14, 1989, pp.823–825, discloses the use of a beam splitter to couple broadband light to a Bragg grating. The device and its method of use are disadvantageous in that the beam splitter attenuates both transmitted light and, even more so, reflected light.

A publication entitled "Intermodal coupler using permanently photoinduced grating in two-mode optical fibre" by H. G. Park and B. Y. Kim, published in Electron Lett., vol. 25, 1989, pp. 1590–1591, disclosed a device in which mode coupler gratings are formed by photorefraction in slightly multi-mode elliptical fibres.

A publication entitled "Narrow-band Optical Waveguide Transmission Filters" by K. D. Hill, D. C Johnson, F. Bilodeau, and S. Faucher, published in Electronics Lett., vol. 23, 1987, pp. 465–466, disclosed a Sagnac loop reflector device which consists of: (a) a twin core fibre at the input and output of the loop and (b) a Bragg grating in the loop which is used to isolate a narrow band of wavelengths. This device and its method of use are disadvantageous in that a beam splitter or coupler is required to transmit the other wavelengths and this causes light loss. Also, for proper functioning, optic path lengths in the loop have to be controlled to fractions of a wavelength and this is difficult to achieve.

U.S. Pat. No. 5,457,758 in the name of Snitzer entitled Add-Drop Device for Wavelength Division Multiple Fiber Optic Transmission System relates to an optical coupler wherein a short period Bragg grating is disposed within the core of two optical fibres. This device is dependent upon evanescent coupling and couples via reflection by the Bragg grating. Although this device may perform its intended function in some instances, there remains a need for a relatively inexpensive device with high coupling efficiencies that does not rely on strong evanescent coupling between the cores of two optical fibres.

In view of the limitation of the prior art devices there remains a need for a relatively efficient inexpensive device that will serve as a coupler.

In is therefore an object of the invention to provide a device that can be utilized for adding or dropping light signals at a predetermined centre wavelength to or from a wavelength division multiplex, fiber optic transmission system which carries signals at other wavelengths. Still there is a need for such a device for use in adding or dropping which can add or drop a predetermined fraction of the light signal. Yet further, there is a need for a coupling device that is tunable wherein the channel to be coupled from one waveguide to another is selected by tuning the device.

An embodiment of the invention conveniently provides an at least 3-port device for use in a transmission system having multiple channels.. The device may be utilized to drop a particular channel at for example wavelength $\lambda_n$, by decoupling that channel out of one waveguide and coupling-in that channel into an adjacent waveguide.

In accordance with this invention there is provided, a device for coupling light having wavelengths in a region at a predetermined wavelength out of or into a transmission system which carries light signals, the device comprising:

a first optical waveguide having a core region and a cladding region, a portion of the core region having a first long period Bragg grating disposed therein;

a second optical waveguide having a core region and a cladding region. a portion of the core region having a second long period Bragg grating disposed therein;

a portion of the cladding about the first long period Bragg grating being optically coupled to a portion of the cladding about the second long period Bragg grating so as to allow at least a predetermined wavelength of light incident upon the first Bragg grating to be forward coupled to the core region of the second optical waveguide via the second Bragg grating.

BRIEF DESCRIPTION OF THE DRAWINGS

Exemplary embodiments of the invention will now be described in conjunction with the drawings in which.

DETAILED DESCRIPTION

Figure 1:
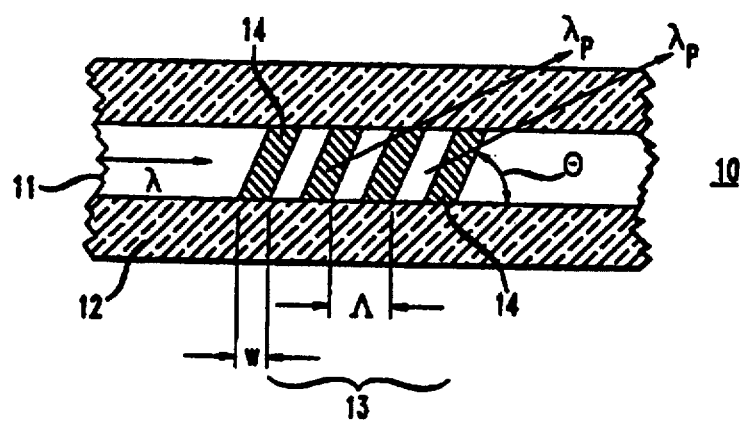
FIG. 1 is a schematic cross section of a prior art long period spectral shaping device.

A. M. Vengsarkar in U.S. Pat. No. 5,430,817, discloses a long period spectral shaping device in the form of a Bragg grating for shifting light of an unwanted wavelength from guided modes within the core into non-guided modes within the cladding of an optical fibre. Turning to prior art FIG. 1, a schematic cross section of a long period spectral shaping device is shown comprising a length of fibre 10 for transmitting light into a guided mode having a core 11 surrounded by a lower index cladding 12. The core 11 includes one or more long period gratings 13 each comprising a plurality of index perturbations 14 of width w spaced apart by a periodic distance A where. typically. 50 $\mu m \leq \Lambda \leq 1500$ $\mu m$. Advantageously $1/5\Lambda \leq w \leq 4/5\Lambda$ and preferably $w=1/2\Lambda$. The perturbations are formed within the glass core of the fibre and preferably form an angle of 74 ($2° \leq \theta \leq 90°$) with the longitudinal axis of the fibre. The fibre is designed to transmit broad band light of wavelength centered about $\lambda$.

Figure 1A:
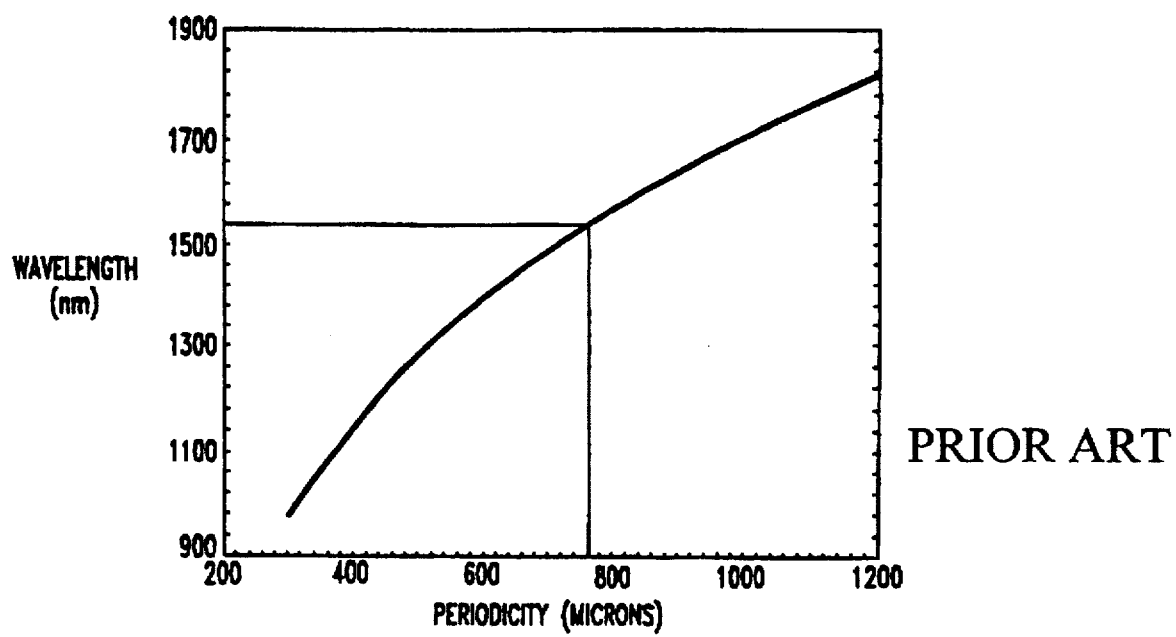
FIG. 1a is a graphical plot of centre wavelength versus period useful in making the device of FIG. 1.
Figure 1B:
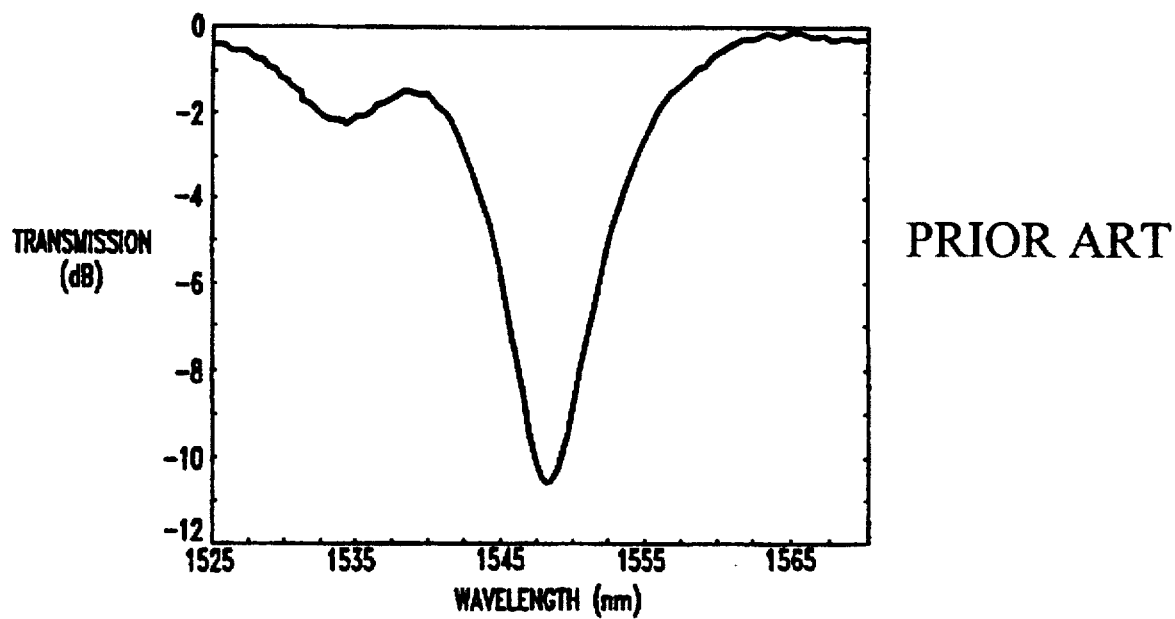
FIG. 1b is a typical transmission spectrum of a long period shaping device used for removal of light in a wavelength region around $\lambda p$.

The spacing $\Lambda$ of the perturbations is chosen to shift transmitted light in the region of a selected wavelength $\lambda p$ from the guided mode into a non-guided mode, thereby reducing in intensity a band of light centered about $\lambda p$. In contrast with conventional short period gratings which reflect light, these long period devices remove the light without reflection b convening it from a guided mode to a non-guided or cladding mode. Prior art FIG. 1a is a graph illustrating the periodic spacing A for removing light centered about a wavelength $\lambda p$. Thus to make a light centered about a wavelength around 1540 nm, one chooses a spacing of about 760 $\mu m$ as is shown in FIG. 1a. FIG. 1b shows the transmission spectrum of a grating with $\lambda p$ at approximately 1550 nm indicating removal of most of the light at $\lambda p$ to non-guided radiation modes. Vengsarkar is primarily concerned with the removal of predetermined wavelengths from the core (guided modes) to the cladding where the mode is essentially non-guided.

The instant invention. utilizes this result, in combination with coupling the non-guided modes into the core of a closely coupled optical fiber.

Figure 2:
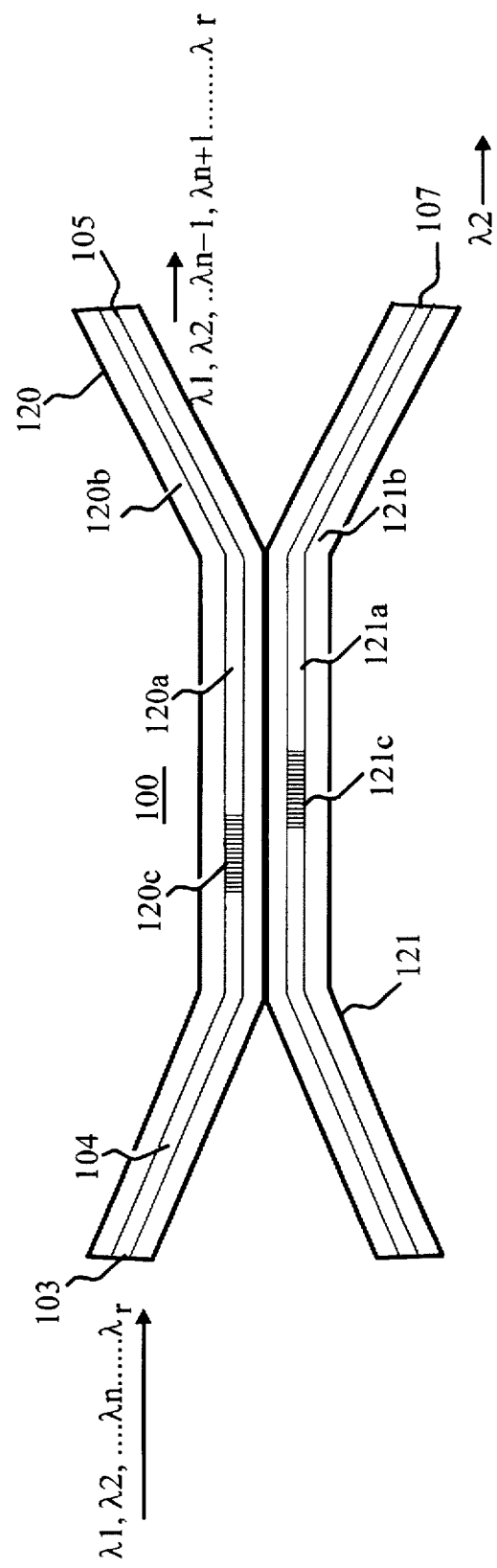
FIG. 2 shows in pictorial form, a device being used to drop a signal $\lambda 2$ into an optical fibre transmission line.

Referring now to FIG. 2. an embodiment of the device 100 in accordance with the invention is shown in pictorial form. As is shown in FIG. 2. device 100 comprises two substantially identical single mode optical fibres 120 and 121 having cores 120a and 121a and respective claddings 120b and 121b respectively. The fibres 120 and 121 are joined together at their claddings 120b and 121b to form a composite waveguide with a propagation constant $\beta cl$. The fibres are preferably glued together with a material which has a refractive index close to that of the fibre claddings and that the interface between the two fibers is smooth. Of course other methods of coupling the claddings may be used. For example, the claddings may be polished flat and subsequently glued together, or alternatively polished flat followed by one of optical contact, fusing, and glass soldering. Within each core 120a and 121a is a long period Bragg grating 120c and 121c respectively, as described heretofore, preferably having a period of about at least 50 $\mu m$ formed by a conventional method. The period of the gratings is equal to the difference in the propagation constants between a mode in the core of the fibre and a mode in the composite cladding of the joined fibres. In the preferred embodiment of the invention, the mode in the cores and the mode in the claddings is the lowest order LP01 mode, but other mode combinations are practicable.

In operation, light in the core of the fiber 120 at a predetermined wavelength (determined by the period of the grating) is coupled by the long period grating 120c into the composite cladding of the two fibers 120 and 121. The magnitude of the coupling can be over 99% for long grating lengths in the order several cm. The light in the cladding at the correct wavelength is then forward coupled into the core 121a of fibre 121 by the long period grating 121c. The light then continues to propagate within the core 121a of fibre 121. Light at other wavelengths outside the operating band of the coupler remains within the core 120a of fibre 120.

The length of the gratings is preferably in the range of 1 to 10 cm; depending upon the bandwidth and magnitude of the coupling that is required. The length over which the two fibres are joined and overlap between the two gratings is chosen to maximize the efficiency of the coupling and is in the region of 1 to 20 cm depending upon the desired characteristics of the coupler. However, overlap between the gratings is not essential. Conveniently, the coupling strength and bandwidth of the passband may be varied by selecting appropriate design parameters. Another feature of this invention is the ability to couple several wavelength bands or channels with a controlled passband shape from one fibre to another.

In operation a wavelength division multiplexed set of light signals at wavelengths in the regions of $\lambda 1, \lambda 2, \lambda 3, \ldots, \lambda n, \ldots, \lambda r$ is incident on port one, designated as port 103. A portion of core 120a which receives input light is designated as core 104. Bragg grating 120c having a period for example of 450 $\mu m$ forward couples a band of light centered about wavelength of approximately 1500 nm into the composite cladding of the two fibres 120 and 121. The band of light centered about wavelength $\lambda 2$ is then coupled into a portion of the core 121a designated as 106 where it exits a port 107. The remaining wavelengths of light λ1, λ3, . . . λn, . . . λr are transmitted through the core 120a and the grating 120c and the light exits port 105.

Figure 3:
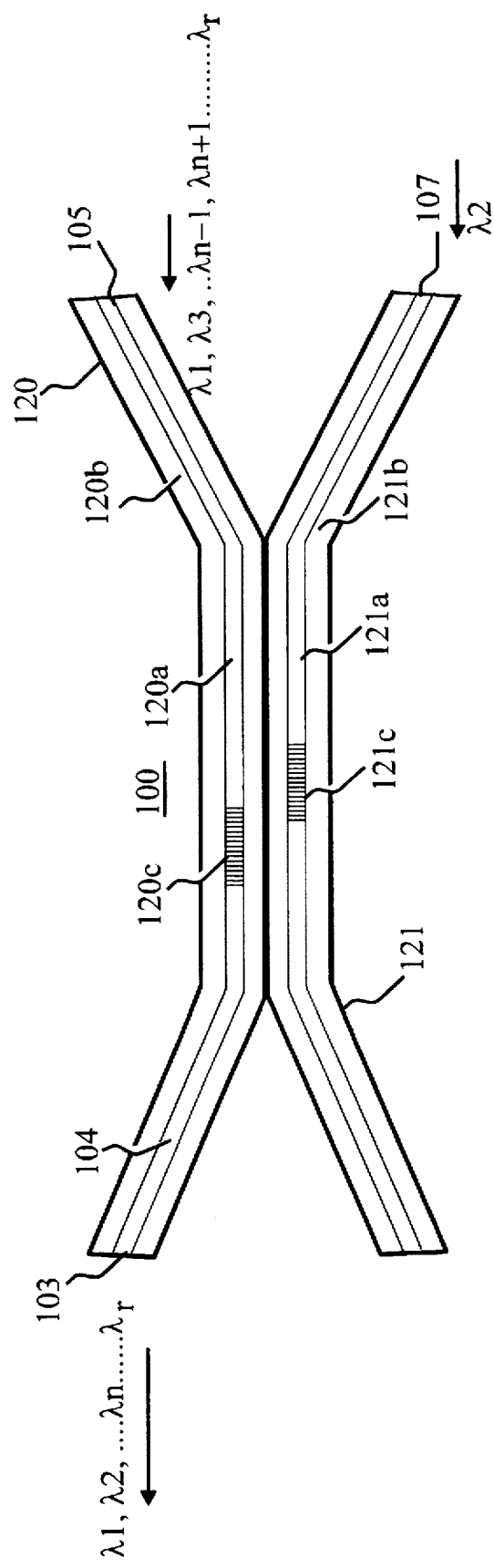
FIG. 3 shows in pictorial form the device of FIG. 2 used to add a signal $\lambda 2$ into an optical fibre transmission line.

Referring now to FIG. 3 a same device 100 to that shown in FIG. 2 is shown used as a means for adding a signal of wavelength λ2 to a group of signals having wavelengths λ1, λ2, λ3, . . . λn, . . . λr. In this embodiment light of wavelength λ2 launched into optical fibre port 107 is coupled out of the fibre core 121a into the cladding by the long period Bragg grating 121c. Subsequently the light is coupled into adjacent fibre 120 and is coupled with the optical signal having wavelengths λ1, λ3, . . . λn, . . . λr.

Figure 4:
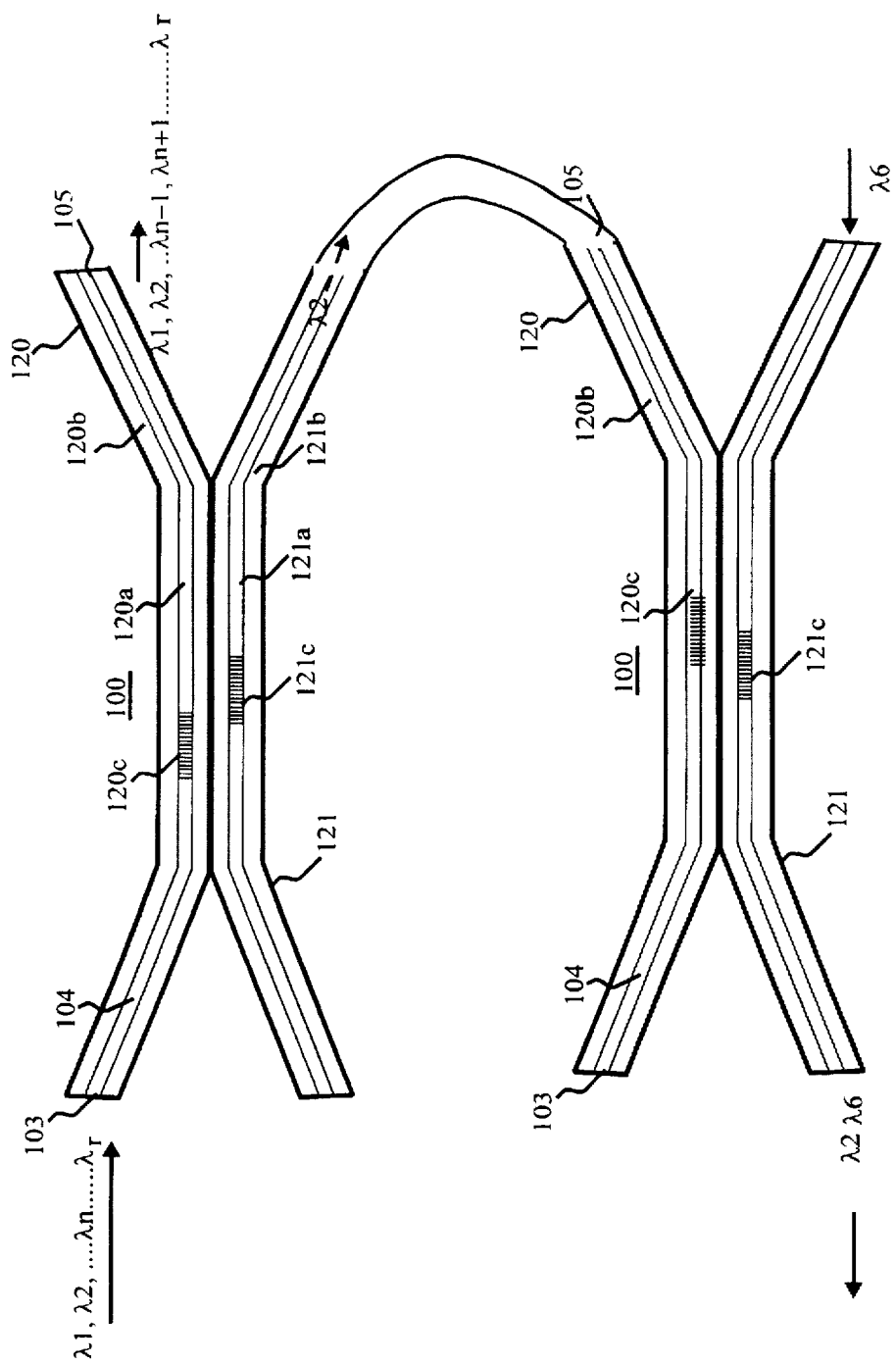
FIG. 4 shows in pictorial form, a series connection of devices that are fabricated in accordance with the present invention being used drop a signal at a wavelength $\lambda 2$ and to add it with with a signal of wavelength $\lambda 6$ into an optical fibre transmission line; and, FIG. 5 shows in pictorial form, an alternative embodiment of the invention wherein a piezoelectric transducer provides adjustment for tuning the coupling device.

A hybrid of FIGS. 2 and 3 is illustrated in FIG. 4 wherein two devices 100 are serially interconnected. Functionally the device provides a means of launching a combined optical signal having wavelengths λ1, λ2, . . . λn, . . . λr, and extracting λ2 and combining it with light of wavelength λ6, wherein the wavelengths λ1, λ3, . . . λn, . . . λr propagate through the waveguide 120 exiting a distal end. Essentially, in this mode of operation the device functions as a drop-add.

Turning now to FIG. 5, a device 500 is shown having a piezo-electric tuning means 510 for controllably adjusting the length of the gratings 120c and 121c by stretching them in small increments in dependence upon a control signal (not shown). This the tuning means 510 preferably stretches both of the gratings a same predetermined amount tuning the gratings to have a same frequency response. This arrangement provides a means of dynamically tuning the coupling frequency of the device.

Of course many other arrangements and numerous other embodiments may be envisaged based on the coupler in accordance with this invention.

What I claim is:

1. A device for coupling light of a predetermined wavelength out of or into a transmission system which carries light signals, the device comprising:

a first optical waveguide having a core region and a cladding region, a portion of the core region having a first Bragg grating disposed therein;

a second optical waveguide having a core region and a cladding region, a portion of the core region having a second Bragg grating disposed therein, the first and second grating each being long period gratings having a period of substantially about 50 μm or more;

a portion of the cladding about the first Bragg grating being optically coupled to a portion of the cladding about the second Bragg grating so as to allow at least a predetermined wavelength of light incident upon the first Bragg grating to be forward coupled to the core region of the second optical waveguide via the second Bragg grating.

2. A device for coupling light as defined in claim 1, wherein the waveguides are single mode waveguides.

3. A device as defined in claim 2, wherein the single mode waveguides are substantially identical.

4. A device as defined in claim 3, wherein the Bragg gratings are substantially identical.

5. A device as defined in claim 4 wherein the Bragg gratings are tunable.

6. A device as defined in claim 4, wherein the Bragg gratings are transmissive to light having at least the predetermined wavelength in the coupling region.

7. A device as defined in claim 4 wherein the first and second Bragg gratings are substantially parallel and have portions which overlap.

8. A device as defined in 7, wherein at least one of the first and second gratings includes means for tuning the grating and varying its wavelength response.

9. A device as defined in claim 8, wherein the means is piezo electric means.

10. A device as defined in claim 2, wherein the first and second gratings each include a plurality of gratings for coupling a plurality of different wavelengths.

* * * * *